US012680760B2

(12) United States Patent
Yoon et al.

(10) Patent No.: US 12,680,760 B2
(45) Date of Patent: Jul. 14, 2026

(54) ROTARY KILN

(71) Applicant: LG Chem, Ltd., Seoul (KR)

(72) Inventors: Jong Seol Yoon, Daejeon (KR); Jun Seok Nho, Daejeon (KR); Chang Seok Ryoo, Daejeon (KR); Dong Hwan Kim, Daejeon (KR); Eun Kyu Seong, Daejeon (KR); Myoung Hwan Oh, Daejeon (KR); Young Min Ko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 514 days.

(21) Appl. No.: 18/031,912

(22) PCT Filed: Oct. 22, 2021

(86) PCT No.: PCT/KR2021/014953
§ 371 (c)(1),
(2) Date: Apr. 14, 2023

(87) PCT Pub. No.: WO2022/097974
PCT Pub. Date: May 12, 2022

(65) Prior Publication Data
US 2023/0384032 A1 Nov. 30, 2023

(30) Foreign Application Priority Data
Nov. 4, 2020 (KR) ........................ 10-2020-0146227

(51) Int. Cl.
*F27B 7/16* (2006.01)
*F27B 7/08* (2006.01)
(Continued)

(52) U.S. Cl.
CPC ................ *F27B 7/161* (2013.01); *F27B 7/08* (2013.01); *F27B 7/10* (2013.01); *F27B 7/16* (2013.01);
(Continued)

(58) Field of Classification Search
CPC .... F27B 7/161; F27B 7/08; F27B 7/10; F27B 7/16; F27B 7/34; F27D 99/0001; F27D 11/12; F27D 2099/0028
See application file for complete search history.

(56) References Cited

U.S. PATENT DOCUMENTS 2,288,372 A * 6/1942 Rump ........................ F27B 7/00
432/118
2002/0022209 A1* 2/2002 Polino ........................ F27B 7/24
432/103
(Continued)

FOREIGN PATENT DOCUMENTS

CN 201587862 U 9/2010
CN 202254814 U 5/2012
(Continued)

OTHER PUBLICATIONS

CN-205207983-U translation (Year: 2025).*
(Continued)

*Primary Examiner* — Michael G Hoang
*Assistant Examiner* — Kurt J Wolford
(74) *Attorney, Agent, or Firm* — Lerner David LLP

(57) ABSTRACT

A rotary kiln comprises: a sintering device provided with a cylindrical rotation tube for mixing an input powder raw material while rotating in a horizontal direction; an external heating device for heating the powder raw material input into the rotation tube by heating the outside of the rotation tube; and an internal heating device for stirring and heating the powder raw material input into the rotation tube simultaneously. The internal heating device includes a microwave generation part for generating microwaves; a guide part for guiding the microwaves generated from the microwave generation part into the rotation tube; and a stirring heat generation part coupled to an inner circumferential surface of the rotation tube for stirring the powder raw material input
(Continued)

into the rotation tube and simultaneously generating heat when absorbing the microwaves so as to heat the powder raw material.

13 Claims, 13 Drawing Sheets

(51) Int. Cl.

| | |
|---|---|
| ***F27B 7/10*** | (2006.01) |
| ***F27B 7/34*** | (2006.01) |
| ***F27D 11/12*** | (2006.01) |
| ***F27D 99/00*** | (2010.01) |

(52) U.S. Cl.
CPC ............ *F27B 7/34* (2013.01); *F27D 99/0001* (2013.01); *F27D 11/12* (2013.01); *F27D 2099/0028* (2013.01)

(56) References Cited

U.S. PATENT DOCUMENTS

| | | | | |
|---|---|---|---|---|
| 2012/0267360 A1 | 10/2012 | Park et al. | | |
| 2013/0200071 A1 * | 8/2013 | Mathis | F27D 11/12 219/756 | |

FOREIGN PATENT DOCUMENTS

| | | | | | |
|---|---|---|---|---|---|
| CN | 103261824 | A | | 8/2013 | |
| CN | 103851899 | A | | 6/2014 | |
| CN | 104190291 | A | | 12/2014 | |
| CN | 205207983 | U | * | 5/2016 | |
| GB | 2414729 | A | | 12/2005 | |
| JP | 2005331158 | A | | 12/2005 | |
| JP | 2008128492 | A | | 6/2008 | |
| JP | 2013119995 | A | | 6/2013 | |
| JP | 2016080270 | A | | 5/2016 | |
| KR | 20010075210 | A | | 8/2001 | |
| KR | 20040069156 | A | | 8/2004 | |
| KR | 101112759 | B1 | | 3/2012 | |
| KR | 20130112894 | A | | 10/2013 | |
| KR | 20140061045 | A | * | 5/2014 | C08J 11/04 |
| KR | 20160070598 | A | | 6/2016 | |
| KR | 101779297 | B1 | | 9/2017 | |
| KR | 101869496 | B1 | * | 6/2018 | F27B 7/16 |
| KR | 20200043262 | A | * | 4/2020 | F27B 7/04 |
| KR | 102126462 | B1 | | 6/2020 | |

OTHER PUBLICATIONS

KR-101869496-B1 translation (Year: 2025).*
KR-20140061045-A translation (Year: 2025).*
KR-20200043262-A translation (Year: 2025).*
International Search Report for PCT/KR2021/014953 mailed Jan. 5, 2022. 3 pgs.
Search Report dated Apr. 25, 25 from the Office Action for Chinese Application No. 202180068140.0 Issued Apr. 27, 25, pp. 1-3.

* cited by examiner

ROTARY KILN

CROSS-REFERENCE TO RELATED APPLICATIONS

The present application is a national phase entry under 35 U.S.C. § 371 of International Application No. PCT/KR2021/014953 filed on Oct. 22, 2021 which claims priority from Korean Patent Application No. 10-2020-0146227, filed on Nov. 4, 2020, all of which are incorporated herein by reference.

TECHNICAL FIELD

The present invention relates to a rotary kiln that heats a powder raw material through a cylindrical rotation tube rotating in a horizontal direction.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Particularly, as technology development and demands for mobile devices increase, the demands for secondary batteries as energy sources are rapidly increasing. Among these secondary batteries, a lithium secondary battery having a high energy density and voltage, a long cycle life, and a low self-discharge rate has been commercialized and widely used.

In the lithium secondary battery, lithium transition metal oxide is used as a positive electrode active material. That is, lithium cobalt oxide having a high operating voltage and excellent capacity characteristics, lithium nickel oxide having a high reversible capacity of about 200 mAh/g and easy implementation of large-capacity batteries, lithium nickel cobalt oxide in which a portion of nickel is substituted with cobalt, lithium nickel cobalt metal oxide in which a portion of nickel is substituted with manganese, cobalt or aluminum, low-cost lithium manganese oxide having excellent thermal stability, lithium iron phosphate having excellent stability, and the like are being used as the positive electrode active material.

The positive electrode active material is prepared by mixing a precursor for producing the positive electrode active material with the lithium raw material and then putting the mixture into a heating device to perform sintering at a high temperature.

Here, a rotary kiln may be applied as the heating device. The rotary kiln comprises a rotation tube which accommodates a precursor for producing a positive electrode active material and a lithium raw material (hereinafter, referred to as a powder raw material) and rotates and mixes the mixture in a horizontal direction, and a heat generation element provided outside the rotation tube to apply heat the rotation tube so that the powder raw material is heated to react.

However, since the rotary kiln according to the related art is provided as an external heating type (or indirect heating type) that heats the outside of the rotation tube, it takes a lot of time to allow a heating temperature to increase up to a temperature for the reaction of the powder raw material (that is, there is a limit to improving a temperature increase rate), and thus, there is a problem in that a length of the rotation tube has to greatly increase. Particularly, there is a problem in that an input amount of powder raw material that is input into the rotation tube does not greatly increase because a temperature deviation between a central portion and an inner wall of the rotation tube is large.

DISCLOSURE OF THE INVENTION

Technical Problem

An object of the present invention for solving the above problems is to a rotary kiln comprising an external heating device that heats the outside of a rotation tube and an internal heating device that heats the inside of the rotation tube to significantly reduce a time that is taken to allow a heating temperature to increase up to a temperature for reaction of a powder raw material, thereby significantly reducing a length of the rotation tube (i.e., a temperature increase rate is faster to reduce the length of the rotation tube). Particularly, an object of the present invention is to provide a rotary kiln that is capable of equalizing a temperature deviation between a central portion and an inner wall of the rotation tube so that an input amount of powder raw material input into the rotation tube significantly increases, thereby improving productivity of the powder raw material.

Technical Solution

A rotary kiln of the present invention may comprise: a sintering device provided with a cylindrical rotation tube configured to mix an input powder raw material while rotating in a horizontal direction; an external heating device configured to heat the powder raw material input into the rotation tube by heating the outside of the rotation tube; and an internal heating device configured to stir and heat the powder raw material input into the rotation tube at the same time, wherein the internal heating device comprises: a microwave generation part configured to generate microwaves; a guide part configured to guide the microwaves generated from the microwave generation part into the rotation tube; and a stirring heat generation part coupled to an inner circumferential surface of the rotation tube and configured to stir the powder raw material input into the rotation tube and simultaneously generate heat when absorbing the microwaves so as to heat the powder raw material.

The stirring heat generation part may comprise: a coupling rod disposed in a longitudinal direction of the rotation tube on an inner circumferential surface of the rotation tube; one or more stirring heat generation elements fitted to be coupled to the coupling rod and configured to stir the powder raw material input into the rotation tube and simultaneously heat the powder raw material while generating heat when absorbing the microwaves; and a coupling piece coupling each of both ends of the coupling rod to the inner circumferential surface of the rotation tube.

The stirring heat generation element may have a tube shape through which the coupling rod passes.

The coupling piece may fix the coupling rod in a state of being spaced a set distance from the inner circumferential surface of the rotation tube.

When two or more stirring heat generation elements are provided, an auxiliary tube that does not generate heat by the microwaves may be fitted and coupled to the coupling rod between the stirring heat generation part and the stirring heat generation element.

The rotation tube may have a coupling groove in an inner circumferential surface of each of both ends thereof, and the coupling piece is fitted into and coupled to the coupling groove.

The rotation tube may comprise an outer tube and an inner tube which is provided inside the outer tube and to which the internal heating device is coupled, and the outer tube and the inner tube may be made of the same material.

The sintering device may further comprise: a raw material input member into which one end of the rotation tube is freely rotatably inserted and which is provided with a raw material input part configured to input the powder raw material into the rotation tube; and a raw material discharge member into which the other end of the rotation tube is freely rotatably inserted and which is provided with a raw material discharge configured to discharge the powder raw material discharged from the rotation tube.

The guide part may comprise a vertical tube having one end connected to the microwave generation part and the other end inserted into the raw material input member and a horizontal tube extending from the other end of the vertical tube to the inside of the rotation tube, wherein a plurality of guide holes through which the microwaves generated from the microwave generation part are emitted into the rotation tube may be formed in the horizontal tube.

The sintering device may comprise: an input protection member having one end fixed to the raw material input member and the other end supported on an outer circumferential surface of one end of the rotation tube to protect a portion between the raw material input member and one end of the rotation tube; and a discharge protection member having one end fixed to the raw material discharge member and the other end supported on an outer circumferential surface of the other end of the rotation tube to protect a portion between the raw material discharge member and the other end of the rotation tube.

The input protection member or the discharge protection member may comprise a corrugated pipe having elastic restoring force in the longitudinal direction of the rotation tube.

The sintering device may further comprise a rotation member provided with a driving gear coupled to surround an outer circumferential surface of the rotation tube and a driving motor engaged with the driving gear to rotate the rotation tube in the horizontal direction through the driving gear.

The stirring heat generation part may be made of silicon carbide (SiC) or graphite.

The external heating device may comprise a heating body configured to surround an outer surface of the rotation tube and a heating medium provided in the heating body corresponding to the rotation tube to heat the rotation tube.

At least two or more stirring heat generation parts may be coupled along a circumference on the inner circumferential surface of the rotation tube.

Advantageous Effects

The rotary kiln according to the present invention may comprise the sintering device, the external heating device, and the internal heating device to significantly reduce the time that is taken to allow the heating temperature to increase up to the temperature for reaction of the powder raw material, thereby significantly reducing the length of the rotation tube (i.e., the temperature increase rate is faster to reduce the length of the rotation tube), in particular, may equalize the temperature deviation between the central portion and the inner wall of the rotation tube so that the input amount of powder raw material input into the rotation tube significantly increases, thereby improving productivity of the powder raw material.

MODE FOR CARRYING OUT THE INVENTION

Figure 1:
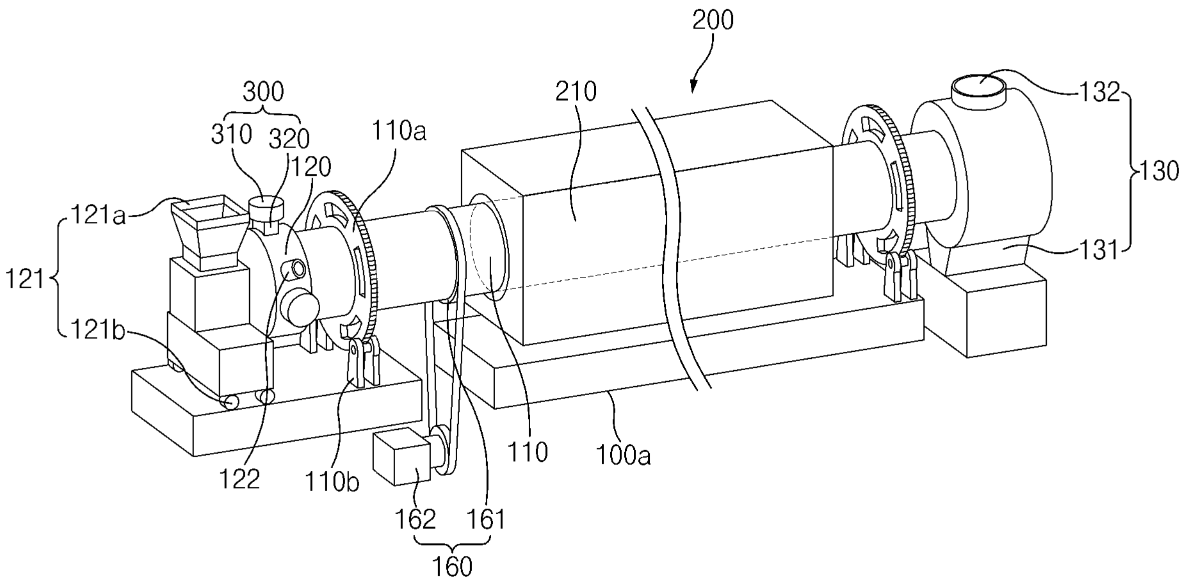
FIG. 1 is a perspective view of a rotary kiln according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Rotary Kiln According to First Embodiment of the Present Invention]

A rotary kiln according to a first embodiment of the present invention may be applied to a complex heating method comprising an external heating device (electric heater and burner) and an internal heating device (microwave) and thus significantly reduce a heating time of a powder raw material by increasing the temperature increase rate, thereby significantly reducing a length of equipment, in particular, since the powder raw material is stirred and directly heated at the same time, production may significantly increase with the same equipment size.

For example, the rotary kiln according to the first embodiment of the present invention, as illustrated in FIGS. 1 to 11, comprises a sintering device 100 provided with a rotation tube that mixes a powder raw material 1 input while rotating in a horizontal direction, an external heating device 200 that directly heats the powder raw material 1 input into the rotation tube by heating the outside of the rotation tube, and an internal heating device 300 that stirs and directly heats the powder raw material input into the rotation tube at the same time.

Sintering Device

The sintering device 100 is configured to rotate the powder raw material in the horizontal direction and comprises a main body 100*a*, a rotation tube 110, a raw material input member 120, a raw material discharge member 130, an input protection member 140, and a discharge protection member 150.

Figure 2:
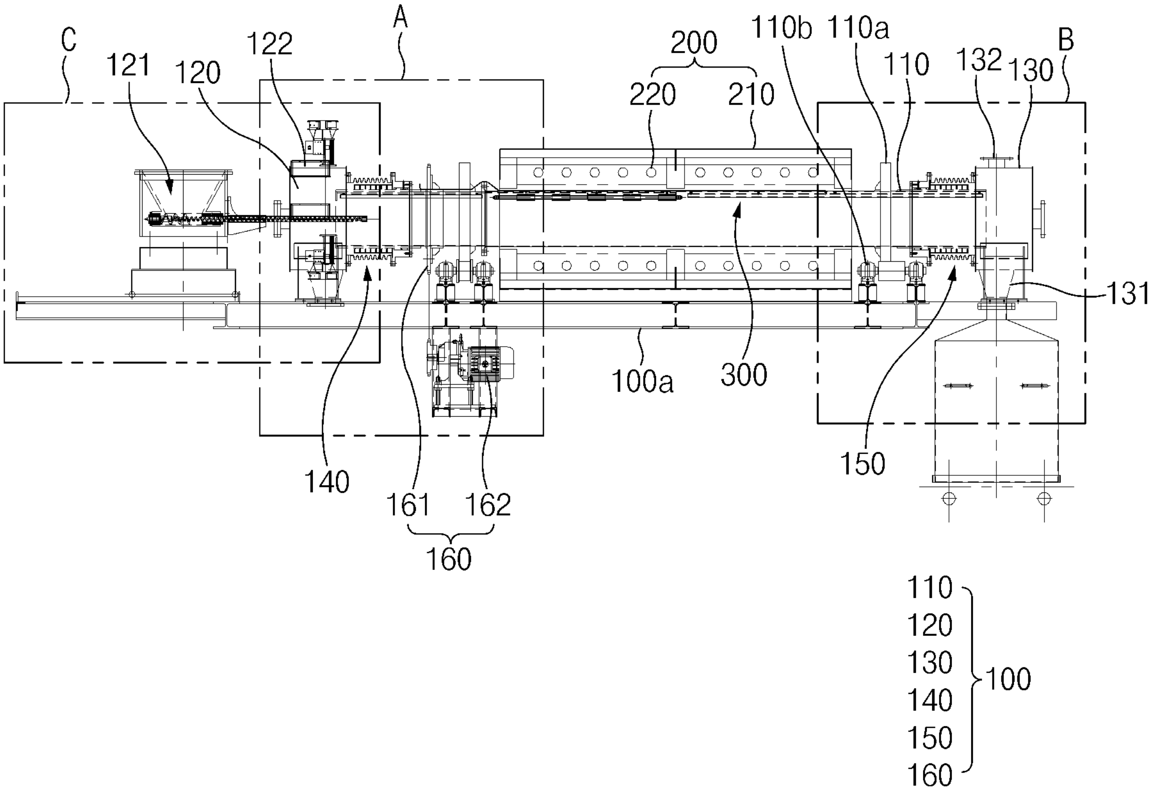
FIG. 2 is a front cross-sectional view of FIG. 1.
Figure 3:
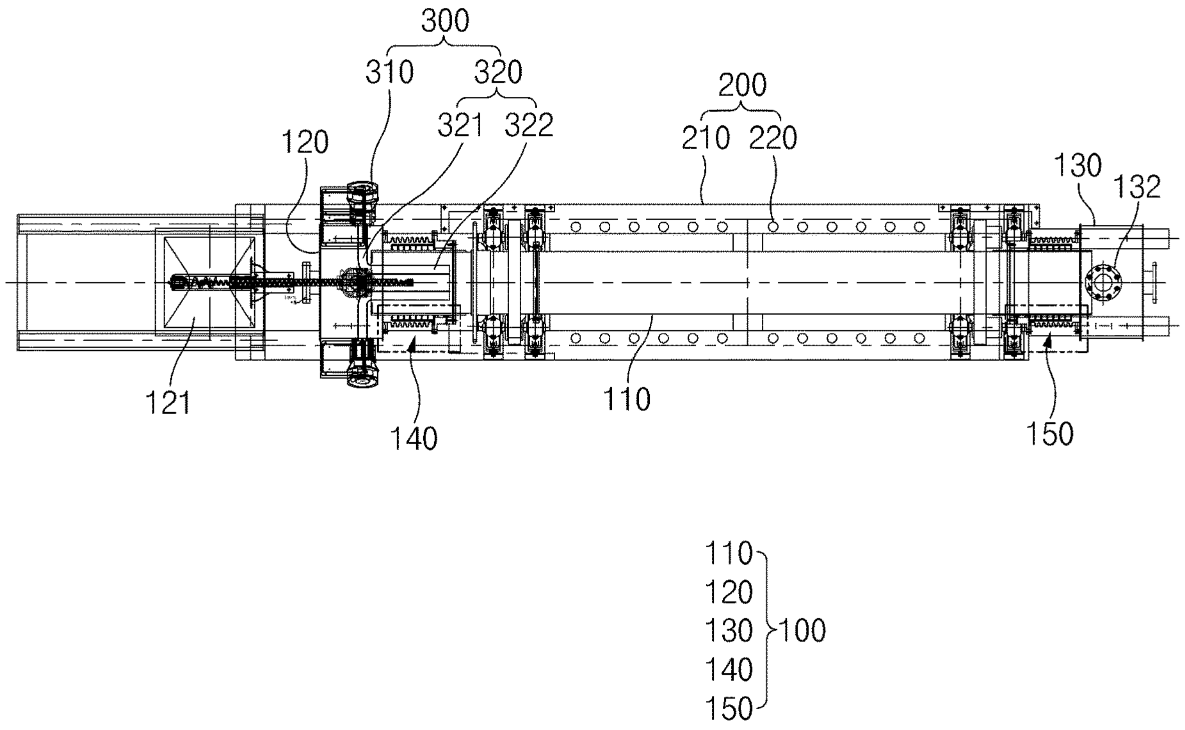
FIG. 3 is a plan cross-sectional view of FIG. 1.
Figure 4:
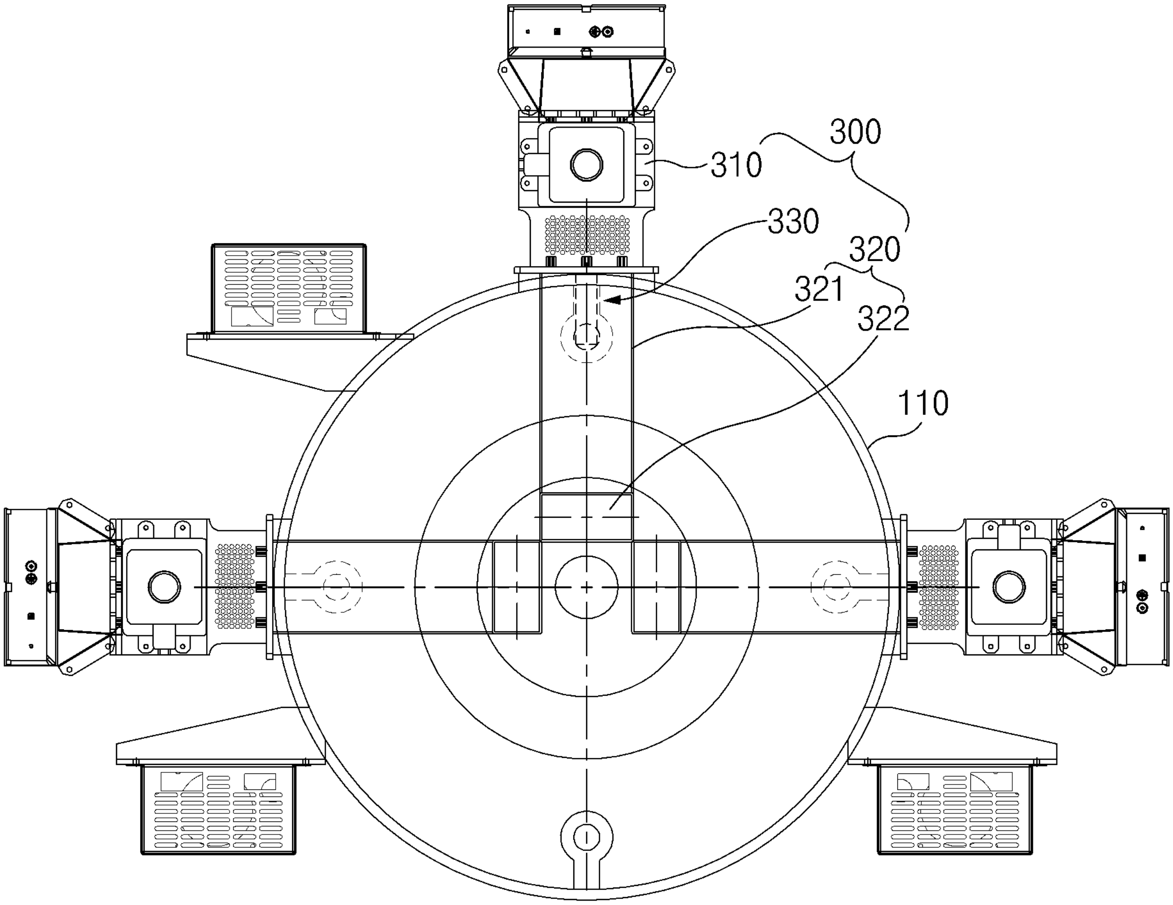
FIG. 4 is a side cross-sectional view of FIG. 1.
Figure 5:
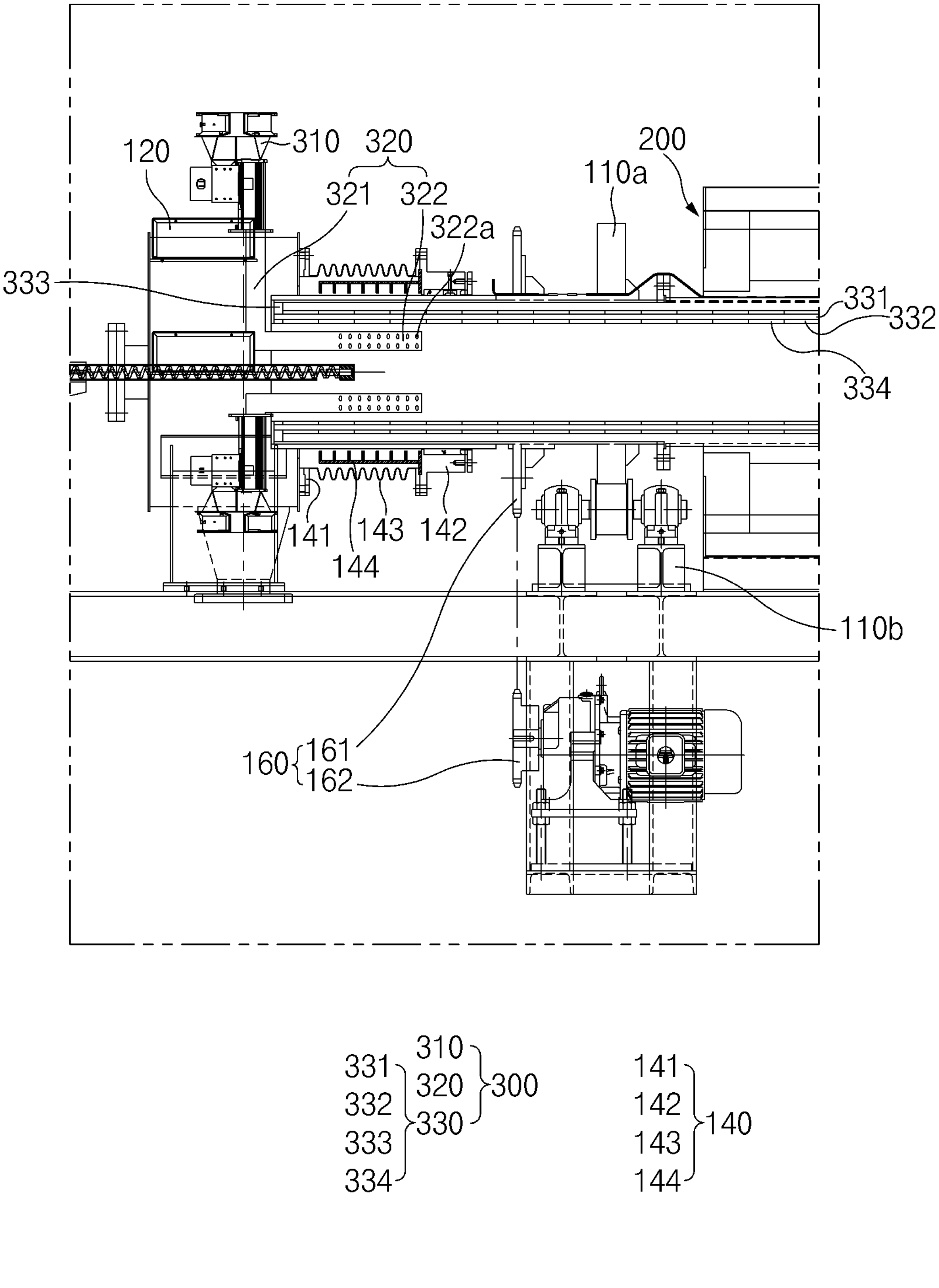
FIG. 5 is an enlarged view of a portion 'A' illustrated in FIG. 1.
Figure 6:
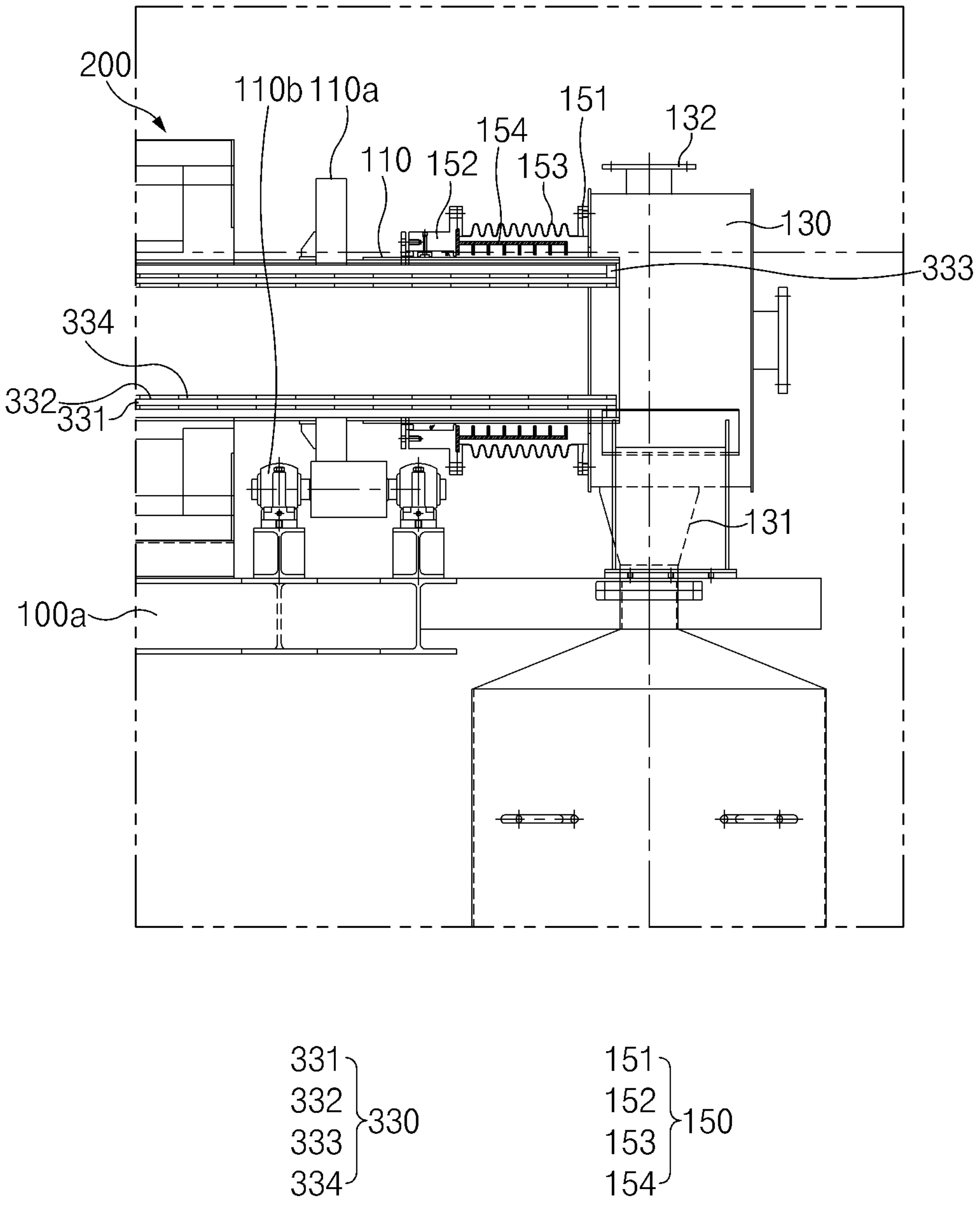
FIG. 6 is an enlarged view of a portion 'B' illustrated in FIG. 1.
Figure 7:
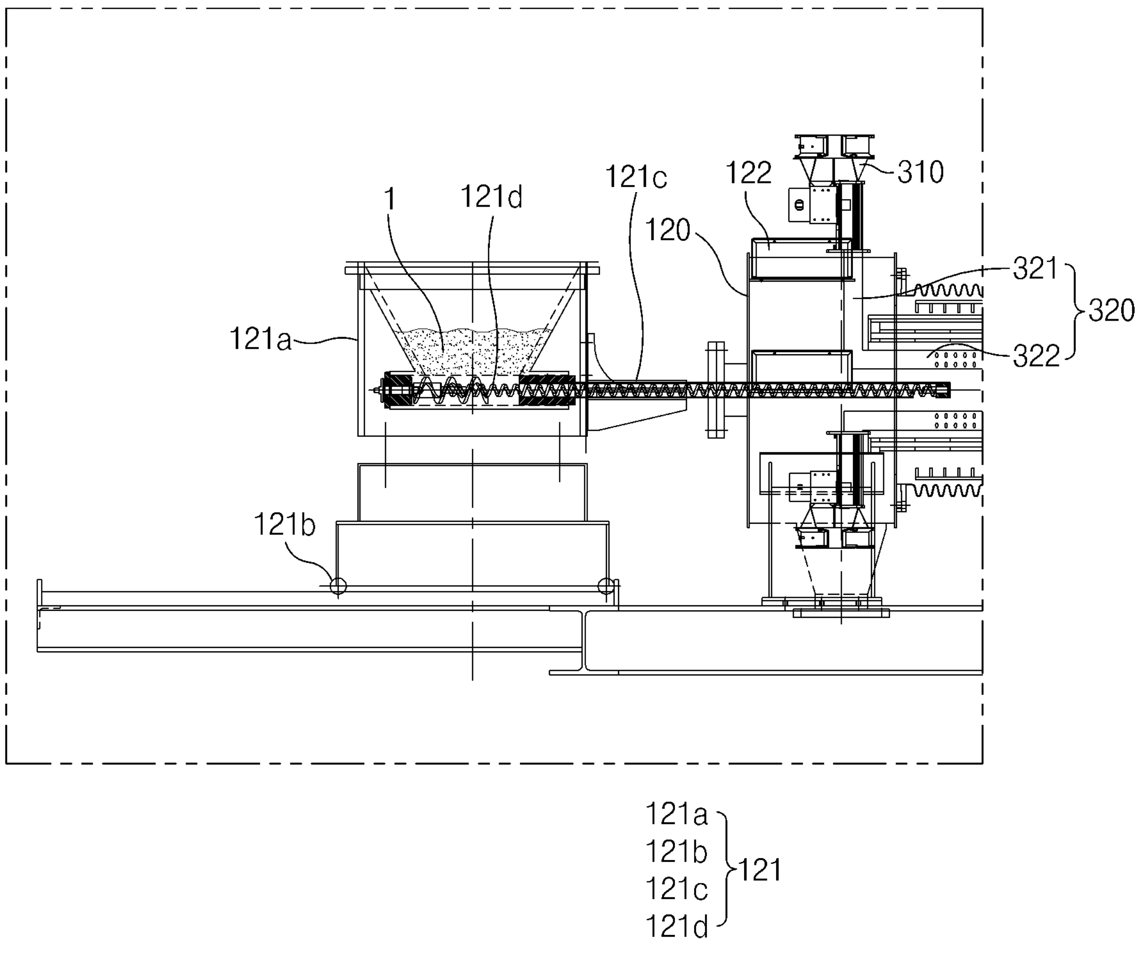
FIG. 7 is an enlarged view of a portion 'C' illustrated in FIG. 1.
Figure 8:
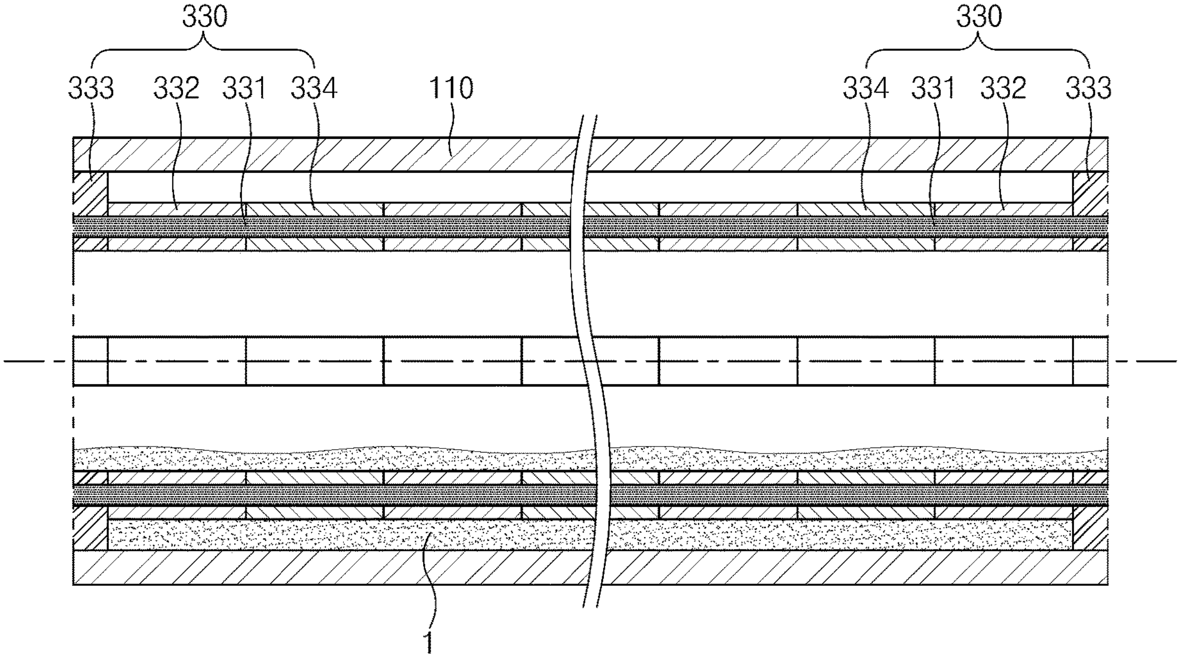
FIG. 8 is an enlarged view of a rotation tube illustrated in FIG. 1.
Figure 9:
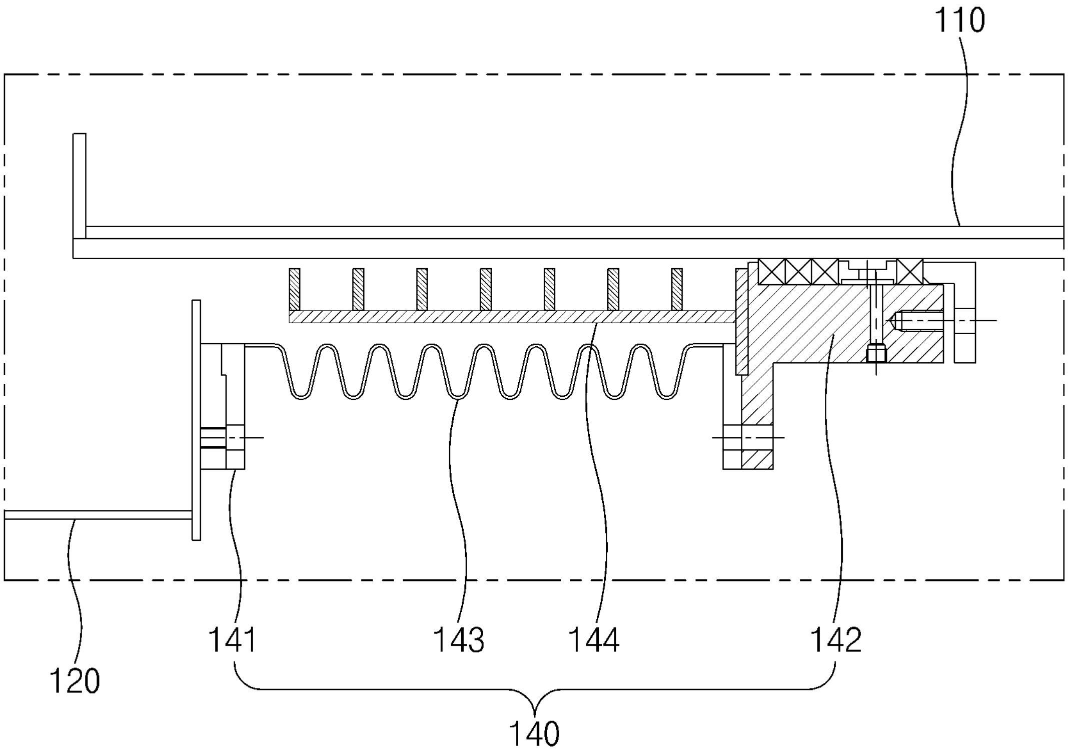
FIG. 9 is an enlarged view of an input protection member illustrated in FIG. 1.
Figure 10:
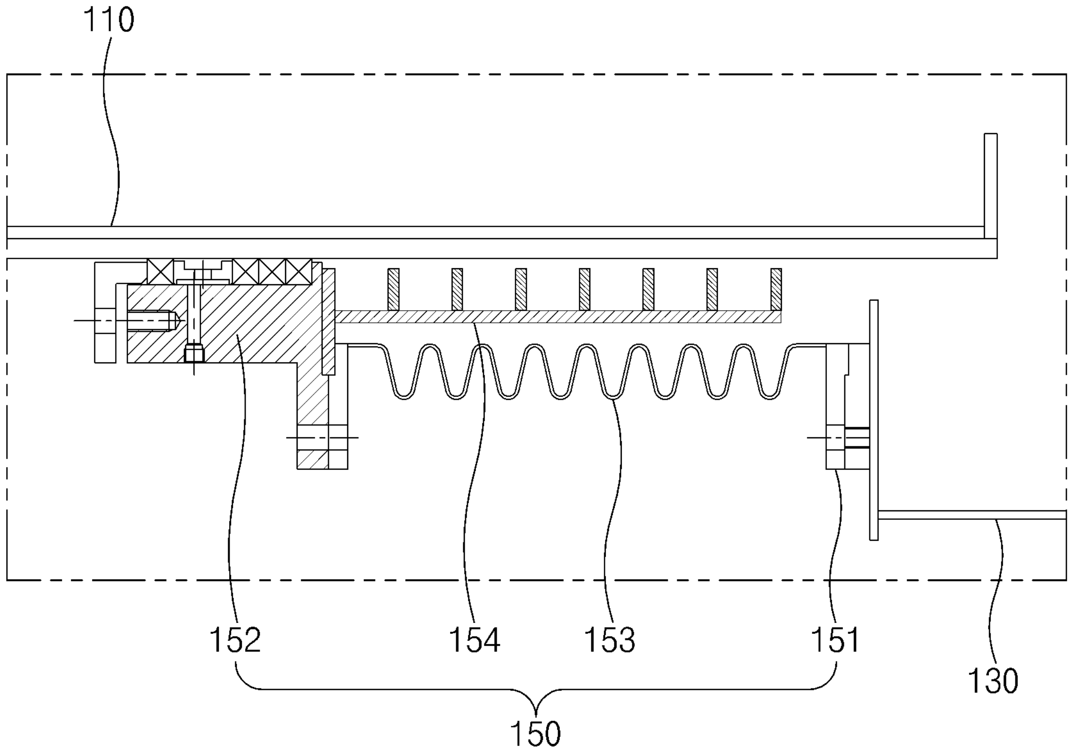
FIG. 10 is an enlarged view of a discharge protection member illustrated in FIG. 1.
Figure 11:
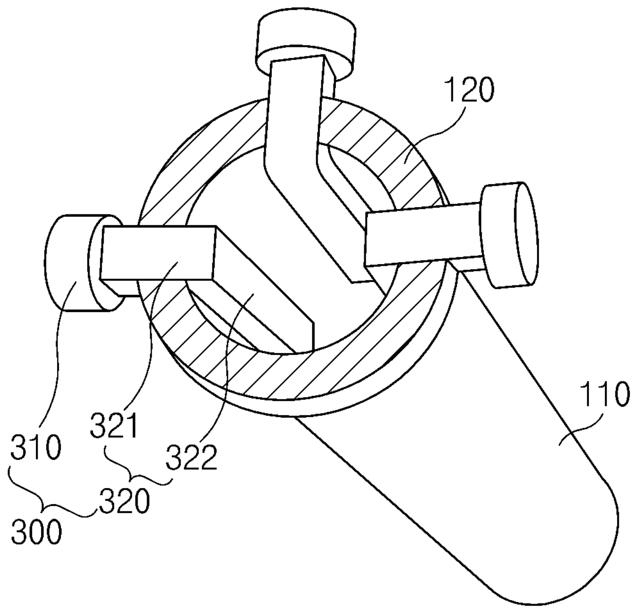
FIG. 11 is a perspective view of a stirring heat generation part illustrated in FIG. 1.

The rotation tube 110 has a cylindrical shape, is elongated in a left and right direction as illustrated in FIG. 2, and is horizontally rotatably installed on a top surface of the main body 100*a* to mix the powder raw material 1.

Here, the rotation tube 110 is installed rotatably in the horizontal direction by a rotation means on the top surface of the main body 100*a*. That is, the rotation means comprises a rotation gear 110*a* provided in a shape surrounding an outer circumferential surface of the rotation tube 110 and a support 110*b* provided with a support gear that is engaged with each of both sides of a bottom surface of the rotation gear 110*a* to support the rotation gear and rotating by the rotation gear 110*a*. In the rotation means having such a configuration, when the rotation tube 110 rotates, the rotation gear 110*a* rotates by being interlocked with the rotation tube 110, and the support gear rotates by the rotation gear 110*a*. Here, since the support gear supports both the sides of the bottom surface of the rotation gear 110*a*, the rotation tube 110 may stably rotate in the horizontal direction.

Here, the rotation means is provided between one end and the main body of the rotation tube 110 and between the other end and the main body of the rotation tube 110 to stably support one end and the other end of the rotation tube 110.

The rotation tube may be made of a metal material having excellent thermal conductivity.

In the raw material input member 120, one end (left end of the rotation tube when viewed in FIG. 2) of the rotation tube 110 is freely rotatably inserted, and a raw material input part 121 that inputs the powder raw material 1 into the rotation tube 110 is provided. That is, the raw material input member 120 inputs the powder raw material 1 into one end of the rotation tube 110 through the raw material input part 121.

Here, the raw material input part 121 is movably installed on a top surface of the main body 100*a* in a direction away from or close to the raw material input member 120. Thus, an outlet through which the raw material is discharged from the raw material input part 121 may be disposed inside the rotation tube 110 through the raw material input member 120, and the outlet of the raw material input part 121 may be disposed to be drawn out of the raw material input member 120. As a result, the maintenance of the raw material input part 121 may be performed more easily. That is, the raw material input part 121 comprises a storage part 121*a* in which the powder raw material 1 is stored, a wheel 121*b* movably installing the storage part 121*a* along a rail provided on the main body 100*a*, a connection tube 121*c* connecting the storage part 121*a* to the raw material input member 120 and the rotation tube 110, and a feed screw 121*d* provided inside the connection tube 121*c* and moving the powder raw material 1 stored in the storage part 121*a* while rotating to input the powder raw material 1 into the rotation tube 110.

The raw material input member 120 further comprises a gas input part 122 that injects a gas into the rotation tube 110 to react with the powder raw material 1, and the gas input part 122 is connected to the inside of one end of the rotation tube 110 through the raw material input member 120.

The raw material input member 120 and one end of the rotation tube 110 is maintained in a state of being spaced a set interval from each other to prevent a heat source of the rotation tube 110 from being directly conducted to the raw material input member 120, thereby preventing the raw material input member from being damaged or deformed. Particularly, a heat-resistant member having heat resistance may be provided between the raw material input member 120 and one end of the rotation tube 110 to significantly prevent the raw material input member 120 from being deformed by the heat source of the rotation tube 110.

The raw material input member 120 having the above configuration may stably input the powder raw material and gas into the rotation tube.

In the raw material discharge member 130, the other end (right end of the rotation tube when viewed in FIG. 2) of the rotation tube 110 is freely rotatably inserted, and a raw material discharge part 131 that discharges the powder raw material 1 from the rotation tube 110 is provided. That is, the raw material discharge member 130 moves and stores the powder raw material 1 discharged from the rotation tube 110 to a set place through the raw material discharge part 131.

Here, the raw material discharge member 130 may be disposed so that the other end of the rotation tube 110 is inserted or moved to be separated from the other end of the rotation tube 110. Thus, it is possible to more easily perform maintenance on the other end of the rotation tube 110 and the raw material discharge member.

The raw material discharge member 130 further comprises a gas discharge part 132 discharging the gas inside the rotation tube 110, and the gas discharge part 132 has a structure connected to the inside of the other end of the rotation tube 110 through the raw material discharge member 130.

The raw material discharge member 130 and the other end of the rotation tube 110 is maintained in a state of being spaced a set interval from each other to prevent a heat source of the rotation tube 110 from being directly conducted to the raw material discharge member 130, thereby preventing the raw material discharge member 130 from being damaged or deformed. Particularly, a heat-resistant member having heat resistance may be provided between the raw material discharge member 130 and the other end of the rotation tube 110 to significantly prevent the raw material discharge member 130 from being deformed by the heat source of the rotation tube 110.

The input protection member 140 is configured to protect a portion between the raw material input member and the rotation tube and has one end fixed to the raw material input member 120 and the other end supported in a shape that surrounds an outer circumferential surface of one end of the rotation tube 110. Thus, it is possible to finish or seal the portion between the raw material input member 120 and one end of the rotation tube 110, and as a result, the portion between the raw material input member 120 and one end of the rotation tube 110 may be protected from the outside. In addition, it is possible to prevent foreign substances generated inside the rotation tube from being discharged to the outside through a gap between the raw material input member 120 and one end of the rotation tube 110.

For example, the input protection member 140 comprises a fixed piece 141 fixed to the raw material input member 120, a support piece 142 supported in a shape surrounding the outer circumferential surface of one end of the rotation tube 110, a connection piece 143 connecting the fixed piece 141 to the support piece 142, and a choke structure 144 for preventing microwave leak.

Here, the connection piece 143 is formed as a corrugated pipe having elastic restoring force in a longitudinal direction of the rotation tube 110 to prevent the connection piece 143 from being deformed.

The support piece 142 may be made of a heat-resistant material so as not to be deformed by the heat source of the rotation tube 110.

The input protection member 140 having such a configuration may stably protect the portion between the raw material input member and the rotation tube.

The discharge protection member 150 is configured to protect a portion between the raw material discharge member and the rotation tube and has the other end fixed to the raw material discharge member 130 and the other end supported in a shape that surrounds an outer circumferential surface of the other end of the rotation tube 110. Thus, it is possible to finish or seal the portion between the raw material discharge member 130 and the other end of the rotation tube 110, and as a result, the portion between the raw material discharge member 130 and the other end of the rotation tube 110 may be protected from the outside. In addition, it is possible to prevent foreign substances generated inside the rotation tube from being discharged to the outside through a gap between the raw material discharge member 130 and the other end of the rotation tube 110.

For example, the discharge protection member 150 comprises a fixed piece 151 fixed to the raw material discharge member 130, a support piece 152 supported in a shape surrounding the outer circumferential surface of the other end of the rotation tube 110, a connection piece 153 connecting the fixed piece 151 to the support piece 152, and a choke structure 154 for preventing microwave leak.

Here, the connection piece 153 is formed as a corrugated pipe having elastic restoring force in a longitudinal direction of the rotation tube 110 to prevent the connection piece 153 from being deformed.

The support piece 152 may be made of a heat-resistant material so as not to be deformed by the heat source of the rotation tube 110.

The discharge protection member 150 having such a configuration may stably protect the portion between the raw material discharge member and the rotation tube.

The sintering device 100 further comprises a rotation member 160 rotating the rotation tube in the horizontal direction. The rotation member 160 comprises a driving gear 161 coupled to surround the outer circumferential surface of the rotation tube 110 and a driving motor 162 engaged with the driving gear 161 to rotate the rotation tube 110 in the horizontal direction through the driving gear 161. Here, the driving gear 161 and the driving motor 162 may be connected to transmit power through a connector such as a chain or belt.

Thus, the sintering device 100 may stably mix the powder raw material input while rotating in the horizontal direction.

External Heating Device

The external heating device 200 is configured to heat the powder raw material input into the rotation tube 110 by heating the outside of the rotation tube 110 and comprises a heating body 210 provided in a shape surrounding an outer surface of the rotation tube 110 and allow one side of the outer surface to be fixed to a top surface of the main body **100*a* and a heating medium 220 provided in the heating body 210 corresponding to the rotation tube 110 to heat the rotation tube 110**.

Here, the heating medium may be any one of an electric heat generation element, SIC, Mo—Si, and a gas burner.

The outer surface of the heating body 210 is made of a heat-resistant material so that the heat source of the heating medium 220 is not discharged to the outside.

When the heating medium 220 is heated, the external heating device 200 having such a configuration may heat the rotation tube 110 by the heating medium 220 and also heat the powder raw material 1 through the heated rotation tube 110.

Internal Heating Device

The internal heating device 300 is configured to stir and heat the powder raw material input into the rotation tube at the same time and comprises a microwave generation part 310 generating microwaves, a guide part 320 guiding the microwaves generated from the microwave generation part 310 into the rotation tube 110, and a stirring heat generation part 330 stirring and heating the input powder raw material at the same time on an inner circumferential surface of the rotation tube 110.

The microwave generation part 310 is configured to generate the microwaves. The microwaves are also called an ultrahigh frequency, and generally refer to radio waves having a frequency of 3 million megacycles and a wavelength of 1 m or less. In more detail, the microwave generation part 310 emits microwaves in a frequency range of about 300 MHz to about 300 GHz.

The guide part 320 comprises a vertical tube 321 having one end connected to the microwave generation part 310 and the other end inserted into the raw material input member 120 and a horizontal tube 322 extending from the other end of the vertical tube 321 to the inside of the rotation tube 110. Thus, the guide part 320 may stably guide the microwaves of the microwave generation part 310 to the inside of the rotation tube 110.

Particularly, a portion between the raw material input member and the rotation tube may be sealed by the input protection member, and a portion between the raw material discharge member and the rotation tube may be sealed by the discharge protection member to prevent external leakage of the microwave guided into the rotation tube from occurring.

A plurality of guide holes **322*a* are formed in the horizontal tube 322, and thus, the microwaves generated from the microwave generation part 310 may be emitted to be dispersed into the rotation tube 110 through the plurality of guide holes 322*a***.

The stirring heat generation part 330 is configured to generate heat by the microwaves and comprises a coupling rod 331 disposed in the longitudinal direction of the rotation tube 110 on the inner circumferential surface of the rotation tube 110, one or more stirring heat generation elements 332 fitted to be coupled to the coupling rod 331 and stirring the powder raw material 1 input into the rotation tube 110 and simultaneously heating the powder raw material 1 while generating heat when absorbing the microwaves, and a coupling piece 333 coupling each of both ends of the coupling rod 331 to the inner circumferential surface of the rotation tube 110.

The stirring heat generation element 332 is made of a material that generates heat when absorbing the microwaves. For example, the stirring heat generation element 332 is made of silicon carbide (SiC) or graphite, preferably silicon carbide (SiC).

The microwaves may raise a temperature of silicon carbide (SiC) to about 1,800° C.

One end of the coupling piece 333 is coupled to the inner circumferential surface of the rotary tube 110 through welding, and the end of the coupling rod 331 is fitted and coupled to a through-hole formed at the other end to fix the coupling rod to an inner surface of the rotary tube 110.

Here, the coupling rod 331 and the coupling piece 333 do not react with each other by microwaves and are made of a heat-resistant material that is strong against heat.

Particularly, the coupling piece 333 may fix the coupling rod 331 in a state of being spaced a set distance from the inner circumferential surface of the rotation tube 110, and thus, the stirring heat generation element 332 coupled to the coupling rod 331 may be spaced apart from the inner circumferential surface of the rotation tube 110 to improve an exothermic property of the stirring heat generation element 332, thereby improving a heating property of the powder raw material 1. The set distance between the inner circumferential surface of the rotation tube 110 and the stirring heat generation element 332 ranges of 5 mm to 10 mm.

The coupling rod 331 may be formed in a circular shape, and the stirring heat generation element 332 may be formed in a tube shape or a cylindrical shape to be coupled to the circular coupling rod 331. That is, the stirring heat generation element 332 is formed in the form of a tube or cylinder to stir the powder raw material 1 input into the rotation tube 110 to minimize vertical drop of the powder raw material when viewed in FIG. 2.

If the stirring heat generation element 330 is provided as two or more stirring heat generation elements 332 coupled to the coupling rod 331, an auxiliary tube 334 separating the two or more stirring heat generation elements 332 from each other is further provided. Here, the auxiliary tube 334 does not react by microwaves and is made of a heat-resistant material that is strong against heat. That is, in the stirring heat generation part 330, the stirring heat generation element 332 and the auxiliary tube 334 may be alternately arranged on the coupling rod 331, or the two stirring heat generation elements 332 and one auxiliary tube 334 may be alternately arranged on the coupling rod 331. Of course, an interval between the three or more stirring heat generation elements 332 disposed on the coupling rod may vary by changing a length of the auxiliary tube 334, On the other hand, at least two or more, preferably four stirring heat generation parts 330 may be coupled to the inner circumferential surface of the rotation tube 110 along a circumference of the rotation tube 110, and thus, the powder raw material 1 input into the rotation tube 110 may be effectively stirred and heated.

In a method for assembling the stirring heat generation part 330 having such a configuration, the stirring heat generation element 332 and the auxiliary tube 334 are coupled to be alternately disposed to the coupling rod 331, and then, the coupling piece 333 is fitted and coupled to both ends of the coupling rod 331. Next, the coupling piece 333 is disposed on the inner circumferential surface of the rotation tube 110 and then coupled through welding.

As for the operation method of the stirring heat generation part assembled in this manner, when the rotation tube 110 rotates in the horizontal direction, the stirring heat generation part rotates by being interlocked with the rotation tube 110. Here, the stirring heat generation element 332 of the stirring heat generation part 330 may generate heat by the microwaves guided into the rotation tube so that the overall internal temperature of the rotation tube 110 to rapidly increase up to a set temperature. Here, the overall internal temperature of the rotation tube may uniformly increase. Thus, it is possible to quickly heat the powder raw material 1 input into the rotation tube 110. Particularly, when the stirring heat generation element 332 is disposed at a lower end of the inner circumferential surface of the rotation tube 110, the stirring heat generation element 332 may be in direct contact with the powder raw material 1 to directly heat the powder raw material 1 and simultaneously move the powder raw material 1 in the rotation direction of the rotation tube 110 to stir the powder raw material 1.

In the present invention, although the circular stirring heat generation element has been described as one embodiment, it may be formed in any one of an ellipse, a triangular, a square, and a rectangular shape.

Therefore, the rotary kiln according to the first embodiment of the present invention may comprise the external heating device and the internal heating device to significantly reduce the heating time of the powder raw material by increasing the temperature increase rate, thereby significantly reducing the length of equipment, in particular, since the powder raw material is stirred and directly heated at the same time, the production may significantly increase with the same equipment size.

Hereinafter, an operation method of the rotary kiln according to the first embodiment of the present invention will be described.

[Operation Method of Rotary Kiln According to First Embodiment of the Present Invention]

First, the rotation tube 110 rotates in the horizontal direction through the rotation member 160. Also, the outside of the rotation tube 110 is heated through the external heating device 200 to increase in internal temperature of the rotation tube 110.

In addition, the inside of the rotation tube 110 is heated through the internal heating device 300 so that the internal temperature of the rotation tube 110 quickly increases up to a set temperature. Here, the internal temperature of the rotation tube 110 increases, and simultaneously, the entire inner side of the rotation tube 110 has a uniform temperature.

That is, when the internal heating device 300 generates the microwaves by the microwave generation part 310, the microwaves generated by the microwave generation part 310 is guided into the rotation tube 110 through the guide part 320, and when the stirring heat generation part rotating by being interlocked with the rotation tube 110 absorbs the microwaves guided into the rotation tube 110, heat is generated to increase in internal temperature of the rotation tube 110.

In this state, when the powder raw material 1 is input into one end of the rotation tube 110 through the raw material input part 121 of the raw material input member 120, the powder raw material 1 is transferred from one end to the other end of the rotation tube 110 and simultaneously mixed and then heated by the external and internal heating devices 200 and 300. Here, the powder raw material 1 is stirred and directly heated by the stirring heat generation part 330 of the internal heating device 300 to improve the stirring property and the heating property.

Here, gas is introduced into the rotation tube 110 through the gas input part 122 to react with the powder raw material 1, and the gas discharged from the rotation tube 110 is collected through the gas discharge part 132.

Thereafter, when the heated powder raw material 1 is discharged through the other end of the rotation tube 110, the powder raw material is stored at a set location through the raw material discharge part 131 of the raw material discharge member 130.

Hereinafter, in descriptions of another embodiment of the present invention, constituents having the same function as the above-mentioned embodiment have been given the same reference numeral in the drawings, and thus duplicated description will be omitted.

[Rotary Kiln According to Second Embodiment of the Present Invention]

Figure 12:
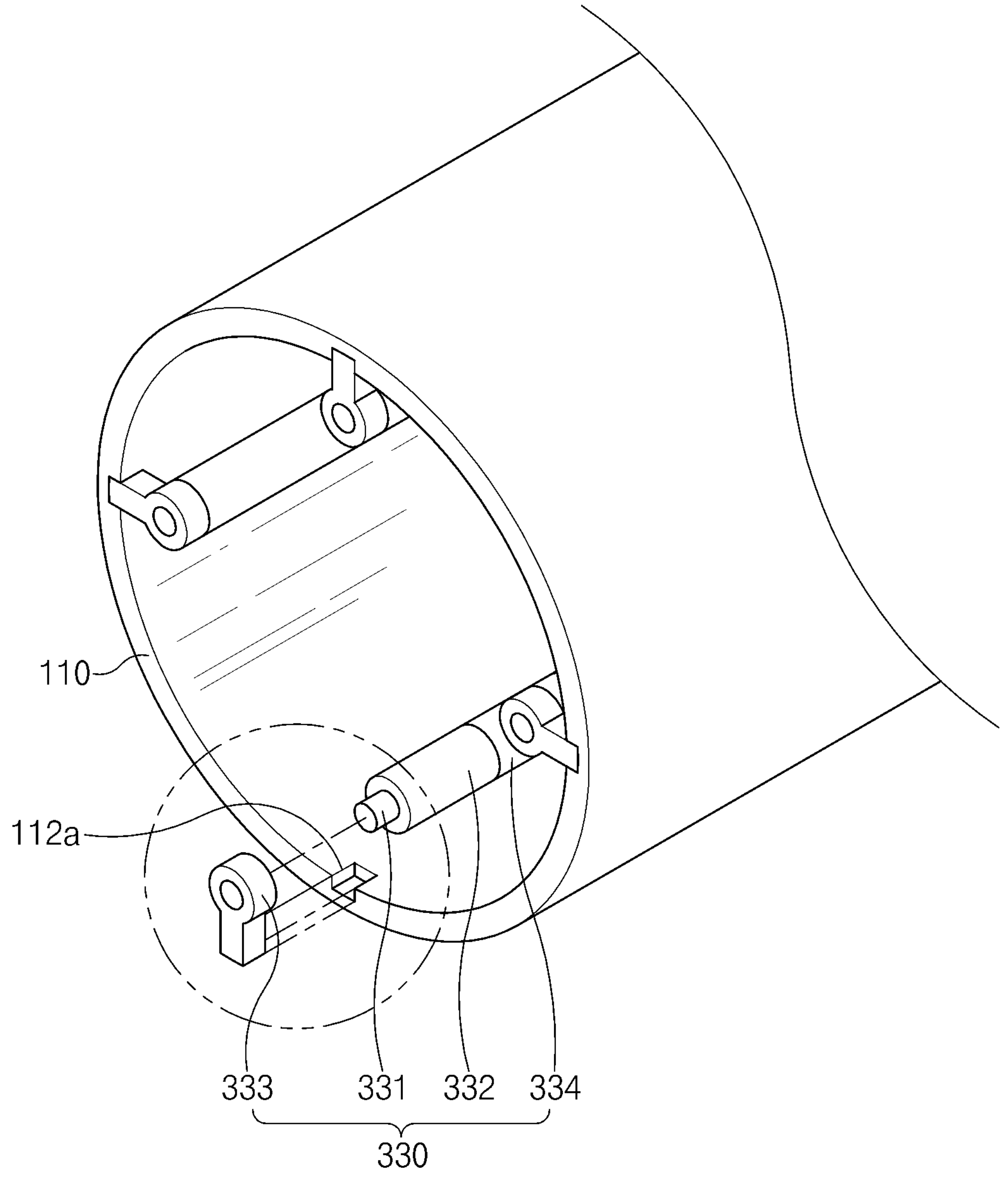
FIG. 12 is a partial enlarged perspective view of a rotary kiln according to a second embodiment of the present invention.

In a rotary kiln according to a second embodiment of the present invention, as illustrated in FIG. 12, a coupling groove 112*a* is formed in each of both ends of an inner circumferential surface of a rotary tube 110, and a coupling piece 333 is fitted and coupled to the coupling groove 112*a*.

Therefore, in the rotary kiln according to the second embodiment of the present invention, the coupling piece 333 may be coupled to the inner circumferential surface of the rotary tube 110 without welding, and as a result, workability may be improved. Particularly, an installation position of a stirring heat generation part installed inside the rotation tube may be easily checked.

[Rotary Kiln According to Third Embodiment of the Present Invention]

Figure 13:
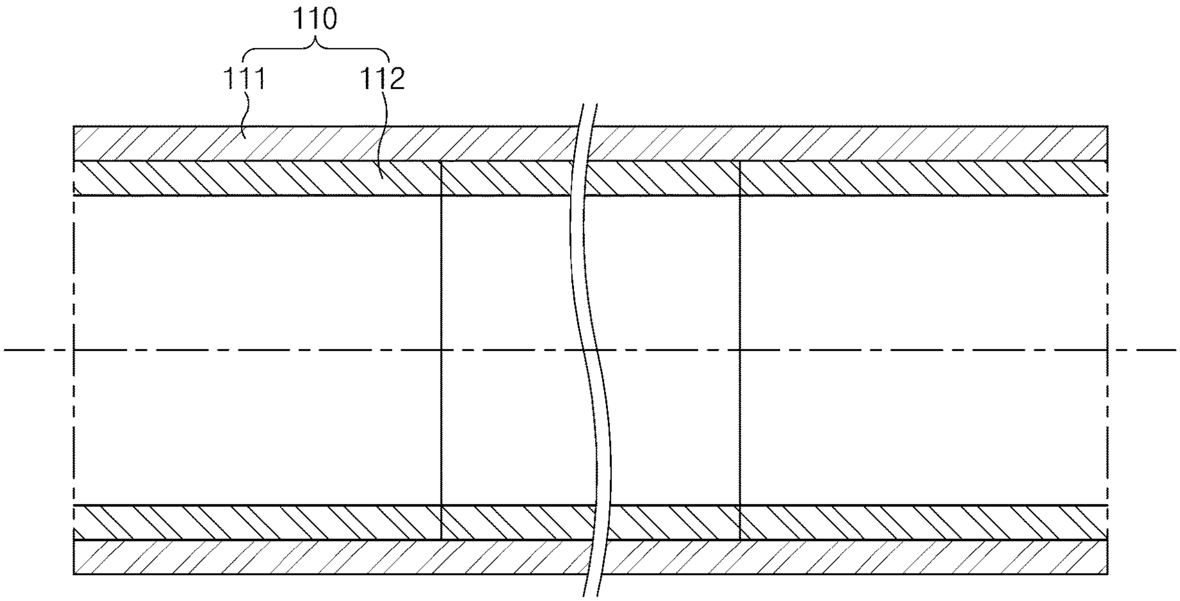
FIG. 13 is a cross-sectional view of a rotary kiln according to a third embodiment of the present invention.

As illustrated in FIG. 13, a rotary kiln according to a third embodiment of the present invention comprises a rotation tube 110. Here, the rotation tube 110 has a double structure. That is, the rotation tube 110 comprises an outer tube 111 and an inner tube 112 which is provided inside the outer tube 111 and to which an internal heating device 300 is coupled.

The outer tube 111 and the inner tube 112 may be made of the same material, and a plurality of inner tubes 112 may be disposed inside the outer tube 111 so as to be connected to each other in the longitudinal direction.

Therefore, the rotary kiln according to the third embodiment of the present invention may solve the problem of disassembling the entire rotary kiln because only the inner tube 112 needs to be separated from the outer tube 111 when the stirring heat generation part is exchanged or repaired.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

1: Powder raw material
100: Sintering device
110: Rotation tube
111: Outer tube
112: Inner tube
112*a*: Coupling groove
120: Raw material input member
121: Raw material input part
122: Gas input part
130: Raw material discharge member
131: Raw material discharge part
132: Gas discharge part
140: Input protection member
150: Discharge protection member
160: Rotation member
161: Driving gear
162: Driving motor
200: External heating device
210: Heating body
220: Heating medium
300: Internal heating device
310: Microwave generation part
320: Guide part
330: Stirring heat generation part
331: Coupling rod
332: Stirring heat generation element
333: Coupling piece
334: Auxiliary tube

The invention claimed is:

1. A rotary kiln comprising:

a sintering device provided with a cylindrical rotation tube configured to mix a powder raw material, the cylindrical rotation tube being configured to rotate about a horizontal axis, the horizontal axis being parallel to a central longitudinal axis;

an external heating device configured to heat the powder raw material input into the rotation tube, the external heating device being configured to heat an exterior of the rotation tube; and an internal heating device configured to simultaneously stir and heat the powder raw material input into the rotation tube, wherein the internal heating device comprises:

a microwave generation part configured to generate microwaves;

a guide part configured to guide the microwaves into the rotation tube; and a stirring heat generation part coupled to an inner circumferential surface of the rotation tube, wherein the stirring heat generation part is configured to stir the powder raw material input into the rotation tube and the stirring heat generation part is configured to absorb the microwaves to generate heat, and wherein the stirring heat generation part comprises:

a coupling rod disposed on the inner circumferential surface of the rotation tube, the coupling rod being parallel to the horizontal axis;

at least one stirring heat generation element configured to be coupled to the coupling rod, the at least one stirring heat generation element being configured to stir the powder raw material input into the rotation tube and being configured to absorb the microwaves to simultaneously heat the powder raw material; and a coupling piece configured to couple each of both ends of the coupling rod to the inner circumferential surface of the rotation tube, and wherein, the at least one stirring heat generation element includes a plurality of stirring heat generation elements, wherein an auxiliary tube is configured to be fitted and coupled to the coupling rod, the auxiliary tube being fixed between the plurality of stirring heat generation elements, and wherein the auxiliary tube is configured to be incapable of heat generation by absorption of the microwaves.

2. The rotary kiln of claim 1, wherein the at least one stirring heat generation element has a tube shape through which the coupling rod is configured to pass.

3. The rotary kiln of claim 1, wherein a position of the coupling rod is fixed by the coupling piece, wherein the coupling rod is spaced a set distance from the inner circumferential surface of the rotation tube.

4. The rotary kiln of claim 1, wherein the rotation tube has a plurality of coupling grooves, the plurality of coupling grooves being recessed in an inner circumferential surface of each of both ends of the rotation tube within which the coupling piece is configured to be disposed.

5. The rotary kiln of claim 1, wherein the rotation tube comprises:
an outer tube; and
an inner tube, the inner tube being positioned inside the outer tube and the inner tube being coupled to the internal heating device,
wherein the outer tube and the inner tube include the same material.

6. The rotary kiln of claim 1, wherein the sintering device further comprises:
a raw material input member, the raw material input member being configured to receive a first end of the rotation tube, wherein the rotation tube is configured to be freely rotatably inserted into the raw material input member;
a raw material input part, the raw material input part being configured to input the powder raw material into the rotation tube;
a raw material discharge member, the raw material discharge member being configured to receive a second end of the rotation tube, where the rotation tube is configured to be freely rotatably inserted into the raw material discharge member; and
a raw material discharge part, the raw material discharge part being configured to discharge the powder raw material discharged from the rotation tube.

7. The rotary kiln of claim 6, wherein the guide part comprises:
a vertical tube, the vertical tube having a first end connected to the microwave generation part and a second end of the vertical tube being inserted into the raw material input member; and
a horizontal tube, the horizontal tube extending along the horizontal axis from the second end of the vertical tube to an interior of the rotation tube,
wherein the horizontal tube includes a plurality of guide holes configured to emit the microwaves into the interior of the rotation tube.

8. The rotary kiln of claim 6, wherein the sintering device comprises:
an input protection member, the input protection member having a first end fixed to the raw material input member and a second end of the input protection member being supported on an outer circumferential surface of the first end of the rotation tube, the input protection member being configured to protect a portion between the raw material input member and the first end of the rotation tube; and
a discharge protection member, the discharge protection member having a first end fixed to the raw material discharge member and a second end of the discharge protection member being supported on an outer circumferential surface of the second end of the rotation tube, the discharge protection member being configured to protect a portion between the raw material discharge member and the second end of the rotation tube.

9. The rotary kiln of claim 8, wherein at least one of the input protection member and the discharge protection member comprises a corrugated pipe, the corrugated pipe having an elastic restoring force in a longitudinal direction of the rotation tube.

10. The rotary kiln of claim 1, wherein the sintering device further comprises a rotation member, the rotation member including a driving gear and a driving motor, wherein the driving gear is coupled with a connector, the connector being configured to surround an outer circumferential surface of the rotation tube and wherein the driving motor is engaged with the driving gear, the driving gear being configured to rotate the rotation tube about the horizontal axis.

11. The rotary kiln of claim 1, wherein the stirring heat generation part includes silicon carbide (SiC) or graphite.

12. The rotary kiln of claim 1, wherein the external heating device comprises:
a heating body, the heating body being configured to surround an outer surface of the rotation tube; and
a heating medium, the heating medium being provided in the heating body.

13. The rotary kiln of claim 1, wherein a plurality of the stirring heat generation parts are coupled to the inner circumferential surface of the rotation tube, the plurality of stirring heat generation parts configured to extend along the horizontal axis.

* * * * *